June 14, 1955 R. T. OROWICK 2,710,727
FILM GUIDE FOR DEVELOPING TANKS
Filed Dec. 24, 1953
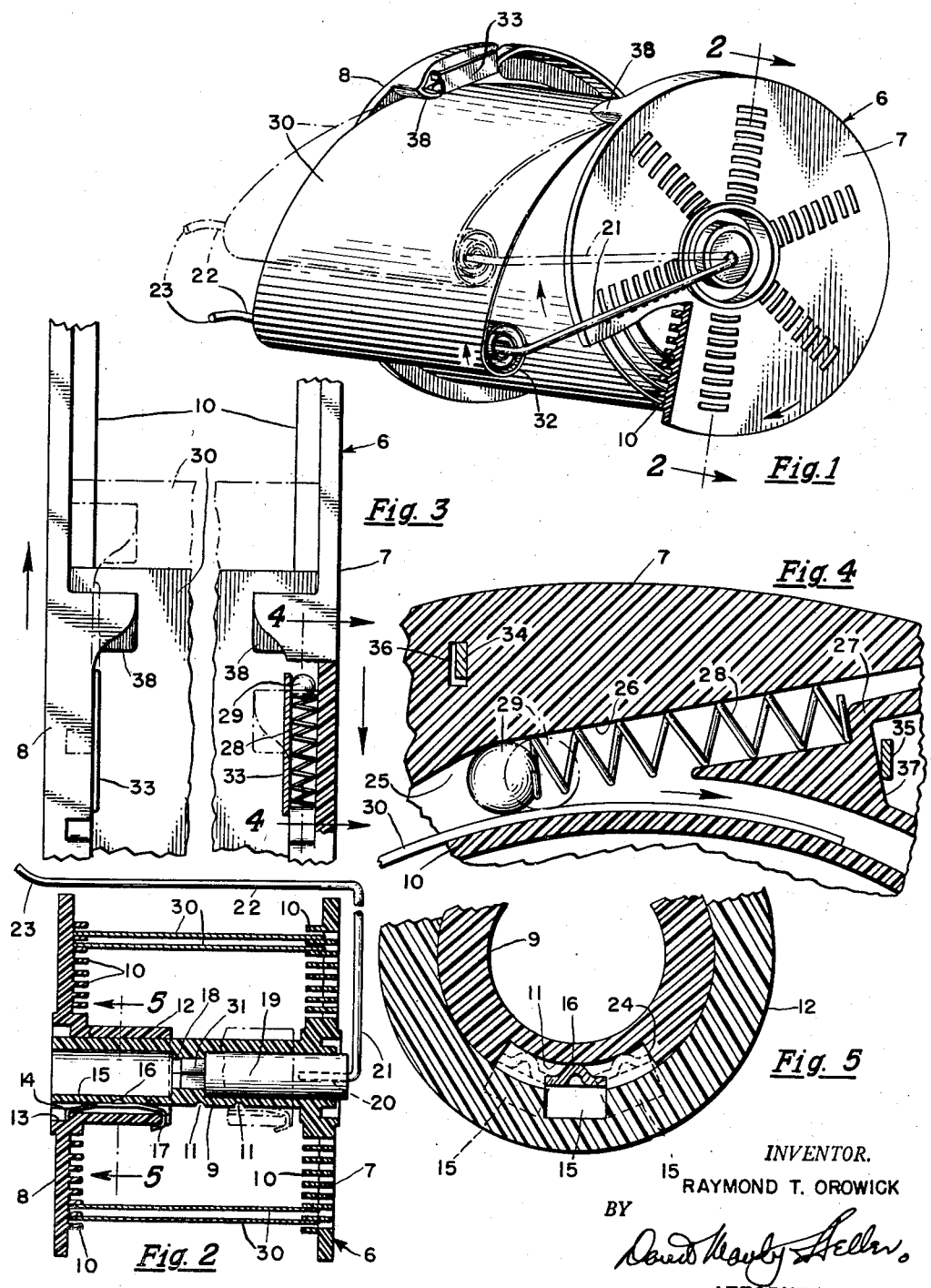
INVENTOR.
RAYMOND T. OROWICK
BY
ATTORNEY

United States Patent Office 2,710,727
Patented June 14, 1955

2,710,727

FILM GUIDE FOR DEVELOPING TANKS

Raymond T. Orowick, Chicago, Ill.

Application December 24, 1953, Serial No. 400,275

2 Claims. (Cl. 242—77)

My invention relates to devices or means for inserting film on a photographic developer spool used in conjunction with a developer tank.

An important object of my invention is to provide a device, for use in conjunction with a photographic developer tank, which permits mounting a roll of exposed film in spiral formation so that its entire surface is exposed to the action of the developer liquid affording a means whereby the said roll of film may be quickly secured by intermittent movements of a pair of reel elements composing an important part of my invention.

A further object of my invention is to provide a film roll holder for holding a film roll in spiral formation, and supporting the coiled portion of the roll of film on an arm which moves during the operation of threading the film into the spiral formation hereinbefore mentioned, and permits the roll of film to be uncoiled freely without entanglement, thus facilitating the operation.

A further object of my invention is to provide one way clutch means which will act as a slip clutch in a reverse direction so as to permit intermittent coiling of the roll of film in spiral formation on the device.

A still further object of my invention is to provide in a device of the aforementioned character means whereby the component elements of the spool winder may be adjusted to accommodate different widths of film.

A still further object of my invention is to provide means to limit the movement between reel components or elements.

Other objects and advantages inherent in my invention will become apparent from an examination of the accompanying drawings, bearing further elucidation in the ensuing description, wherein like symbols are used to designate like parts, and in which:

Fig. 1 is a perspective view showing, by the direction of arrows the operation of the reel element in coiling a roll of film therebetween in spiral formation.

Fig. 2 is a longitudinal cross-sectional view taken, substantially, on the lines 2—2 of Fig. 1 and indicating the film roll holder to facilitate the coiling of the film in spiral formation.

Fig. 3 is an enlarged view showing two fragmentary portions of the spool holder element and indicating the intermittent movement thereon by the arrows shown.

Fig. 4 is an enlarged cross-sectional view taken, substantially, on the lines 4—4 of Fig. 3 indicating the slip clutch mechanism, an important element of my invention.

Fig. 5 is a fragmentary and enlarged cross-sectional view taken, substantially, on the lines 5—5 of Fig. 2.

Referring to the various views my invention is generally designated 6, and consists of the disc or reel elements 7 and 8, the disc element 7 being provided with an extended central hub element 9 which fits into the enlarged hub element 12 of the disc element 8. The hub 9 is provided with a number of indentations 11 in order to permit the locating detent 16 in the spring element 15 to engage the same, for adjustment purposes, when it is desired to accommodate different widths of films 30 between the disc or reel elements 7 and 8. In other words, the disc elements may be brought closer together or pulled further apart, thus varying the confines between the spiral ledges 10 for securing different dimensions of film. A counterbore 13 holds bent end 14 of spring 15 in anchored support with the other end 17 of spring 15.

The hub 9 is provided with a recess 24 of limited arcuate magnitude in which the spring element 15 operates, thus limiting the motion of the disc 7, which is rotated intermittently clockwise and counter-clockwise. The hub 9 is also provided with a square opening 18 engageable by the square shank 31 of the core element 19 which fits loosely therein, and is also removably associated therewith to permit removal of core 19 when not used for mounting a roll of film 30. The roll of film 30 fits between the discs 7 and 8 and is configurative with the spirally formed ledges 10. The film 30 consists usually of a roll 32, and since most of the work of attaching the film is done in a darkroom, construction is made so as to be used in a foolproof manner, so that it will require little skill to insert the film into the device. Each disc element 7 and 8 is provided with an extended hub enclosure designated 38 having the bore 26 therein which is restricted at the left hand end as indicated at 25 in order to entrap the ball clutch 29, which is urged toward the left by the expansion spring 28 mounted in the bore 26, an abutment 27 being provided to maintain the spring at the other end. The film 30 is placed over the initial portion of the ledge 10 and fed under the ball clutch 29. The ball being pushed by the film toward the right will allow enough space between its peripheral surface and the top surface of the ledge 10 to accommodate the thickness of the film 30, the spring urging the same into locked position by virtue of the reduction of the bore at 25. The film, after being inserted in both clutch mechanisms on the disc 7 as well as on the disc 8 will then follow through the path of the spiral ledge formations 10 by manipulating the disc 7 back and forth within the orbit of the confines of the slot 24, the spring 15 limiting the movement, the detent 16 operating within slot 11 in order to maintain the spool element at a proper distance for the particular width of film 30 that is employed. While the discs are being rotated the square opening 18 is in engagement with the square shank 31 of the core element 19, to which is attached at 20 the wire roll support 21 having a horizontal leg extension 22, and a bent portion 23 in order to prevent the roll of film 32 from escaping its horizontal mount portion 22.

Thus the roll holder element 21 will travel the same arcuate distance as the disc 7 during its rotation back and forth, and hence permit the roll 32 to be unwound when turning the disc element 7 counter-clockwise and then rolling along therewith while the clutch element 29 grasps the film 30 and advances it a distance equivalent to the ambit of arcuate portion 24. Likewise, while the clutch on the disc 7 is engaged to act as a grip clutch the clutch structure on disc element 8 will act as a slip clutch and conversely when the disc 7 is rotated counter-clockwise then it will act as a slip clutch and the clutch structure on disc element 8 will act as a grip clutch, thus the film is advanced in increments equivalent substantially to the magnitude of the cutout or recess 24. The clutch assembly is preferably held in place by a plate 33 which has extensions 34 and 35 mounted in slot 36 against the abutment 37.

Thus the clutch assembly is arranged to act as a grip clutch when the device is rotated in one direction, and when rotated in the opposite direction the clutch mechanism on the disc 7 acts to grip the film while the clutch mechanism on the disc 8 will allow the film to slip, and conversely when the film slips in the clutch mechanism on disc 7 it will be gripped by the clutch mechanism on the disc 8. Thus, by intermittently rotating clockwise and counterclockwise the disc element 7 within the ambit of the recess 24, or by both hands working the disc 7 and 8 in opposed directions alternately, the same feeding operation will take place, ultimately causing the roll of film 32 to be unwound and formed in a spiral formation spaced apart by the spiral ledges 10, so that when the reel with the film mounted therein is subsequently immersed in a photographic developer tank the developer liquid will reach all portions of the film that has been exposed, and develop the same.

While I have illustrated and described what I now regard as the preferred form of construction, it is to be understood that I expressly reserve the right to make all such changes or modifications as may fairly fall within the scope of the appended claims.

Having thus described and revealed my invention, what I claim as new and desire to secure by Letters Patent is:

1. A spool for developing tanks accommodating a length of film comprising a pair of disc elements adjustably disposed on a common axis at selected distances from each other, at least one of said discs being rotatable relative to the other for a predetermined angular displacement, the said disc element being interconnected by telescopic engagement of a male hub on one disc element fitted to a female hub on the other disc element, a square opening in one of said hubs, and film roll support and guide means provided with a square shank portion engaging removably the said square opening, the said film roll support and guide means being motivated by the rotatable disc element.

2. A spool in accordance with claim 1 wherein the film roll support and guide means, comprises a core element, a "U-shaped" wire element secured thereto forming a film roll horizontal mount outside the confines of the said spool, the said horizontal mount terminating in a bent portion for maintaining the said film roll on the said horizontal mount.

References Cited in the file of this patent

UNITED STATES PATENTS

| | | |
|---|---|---|
| 1,292,640 | Phelps | Jan. 28, 1919 |
| 2,400,943 | Morgan et al. | May 28, 1946 |
| 2,548,323 | Shimizu | Apr. 10, 1951 |
| 2,595,898 | Siedenburg | May 6, 1952 |
| 2,640,659 | Biko et al. | June 2, 1953 |